US010929772B1

(12) United States Patent
Diuk Wasser et al.

(10) Patent No.: US 10,929,772 B1
(45) Date of Patent: Feb. 23, 2021

(54) SYSTEMS AND METHODS FOR MACHINE LEARNING BASED AGE BRACKET DETERMINATIONS

(71) Applicant: Facebook, Inc., Menlo Park, CA (US)

(72) Inventors: Carlos Gregorio Diuk Wasser, Mountain View, CA (US); Michael Lee Develin, San Francisco, CA (US); Smriti Bhagat, San Francisco, CA (US); Viet An Nguyen, Foster City, CA (US); Daniel Matthew Merl, Livermore, CA (US)

(73) Assignee: Facebook, Inc., Menlo Park, CA (US)

( * ) Notice: Subject to any disclaimer, the term of this patent is extended or adjusted under 35 U.S.C. 154(b) by 1081 days.

(21) Appl. No.: 15/385,318

(22) Filed: Dec. 20, 2016

(51) Int. Cl.
*G06N 5/04* (2006.01)
*G06Q 50/00* (2012.01)
*G06N 20/00* (2019.01)

(52) U.S. Cl.
CPC .............. *G06N 20/00* (2019.01); *G06Q 50/01* (2013.01)

(58) Field of Classification Search
CPC ..................................................... G06Q 50/01
See application file for complete search history.

(56) References Cited

U.S. PATENT DOCUMENTS

| 8,073,807 | B1 * | 12/2011 | Srinivasaiah | G06Q 30/00 706/45 |
| 2009/0187520 | A1 * | 7/2009 | Liu | G06Q 30/02 706/21 |
| 2010/0082360 | A1 * | 4/2010 | Chien | G06Q 30/0269 705/14.53 |
| 2012/0042262 | A1 * | 2/2012 | Priyadarshan | G06Q 30/0269 715/745 |
| 2012/0047560 | A1 * | 2/2012 | Underwood | G06F 21/30 726/4 |
| 2012/0110071 | A1 * | 5/2012 | Zhou | G06Q 30/02 709/204 |
| 2015/0370798 | A1 * | 12/2015 | Ju | G06F 16/24578 707/748 |
| 2017/0032398 | A1 * | 2/2017 | Li | G06F 11/0721 |
| 2017/0357890 | A1 * | 12/2017 | Kim | G06F 40/30 |
| 2018/0096436 | A1 * | 4/2018 | Pal | G06Q 50/01 |

OTHER PUBLICATIONS

Perozzi, Bryan, and Steven Skiena. "Exact age prediction in social networks." Proceedings of the 24th International Conference on World Wide Web. 2015. (Year: 2015).*
Dong, Yuxiao, et al. "Inferring user demographics and social strategies in mobile social networks." Proceedings of the 20th ACM SIGKDD international conference on Knowledge discovery and data mining. 2014. (Year: 2014).*

* cited by examiner

*Primary Examiner* — Hal Schnee
(74) *Attorney, Agent, or Firm* — Sheppard Mullin Richter & Hampton LLP

(57) ABSTRACT

Systems, methods, and non-transitory computer readable media are configured to apply a machine learning model to predict an age division for a user based on user information. An age bracket within the age division including a largest number of connections of the user can be determined. The determined age bracket can be assigned for the user.

20 Claims, 7 Drawing Sheets

500

Apply a machine learning model to predict an age division for a user based on user information
502

Determine an age bracket within the age division including a largest number of connections of the user
504

Assign the determined age bracket for the user
506

FIGURE 5

SYSTEMS AND METHODS FOR MACHINE LEARNING BASED AGE BRACKET DETERMINATIONS

FIELD OF THE INVENTION

The present technology relates to machine learning. More particularly, the present technology relates to techniques for determining age brackets based on machine learning in connection with a social networking system.

BACKGROUND

Users often utilize computing devices for a wide variety of purposes. Users can use their computing devices to, for example, interact with one another, access media content, share media content, and create media content. In some cases, media content can be provided by users of a social networking system. The media content can include one or a combination of text, images, videos, and audio. The media content may be published to the social networking system for consumption by others.

Media content items can be maintained by a social networking system. Access to media content items can be provided to users through various pages, products, or other offerings of the social networking system. The users can constitute members of the social networking system who represent a wide spectrum of demographic profiles. For example, the users can fall into various age brackets, among other demographic categories.

SUMMARY

Various embodiments of the present technology can include systems, methods, and non-transitory computer readable media configured to apply a machine learning model to predict an age division for a user based on user information. An age bracket within the age division including a largest number of connections of the user can be determined. The determined age bracket can be assigned for the user.

In some embodiments, the determination of an age bracket within the age division including a largest number of connections of the user can be in response to the age division not including a stated age of the user.

In some embodiments, an age bracket within the age division including the stated age can be determined in response to the age division including the stated age of the user.

In some embodiments, a score relating to a preliminary determination of the age division for the user can be generated based on the machine learning model.

In some embodiments, the score can be evaluated with a threshold associated with a region associated with the user. The user can be determined to be within the age division if the score satisfies the threshold.

In some embodiments, the threshold can relate to a selected accuracy in determination of an age division for a user associated with the region.

In some embodiments, the machine learning model can be trained based on training data including profile information of users of a social networking system and labels indicating age divisions for the users. The profile information of the users can include profile information of users in different regions.

In some embodiments, features of the machine learning model can comprise at least one of a stated age of a user and a percentage of connections of the user on the social networking system that claim to be a same age as the user.

In some embodiments, the age division and a second age division can be based on a dividing age and each of the age division and the second age division can include a plurality of age brackets.

In some embodiments, engagement by users in a plurality of age brackets across a plurality of products can be compared.

It should be appreciated that many other features, applications, embodiments, and/or variations of the disclosed technology will be apparent from the accompanying drawings and from the following detailed description. Additional and/or alternative implementations of the structures, systems, non-transitory computer readable media, and methods described herein can be employed without departing from the principles of the disclosed technology.

BRIEF DESCRIPTION OF THE DRAWINGS

FIG. 5 illustrates an example method relating to determination of an age bracket for a user, according to an embodiment of the present technology.

Figure 1:
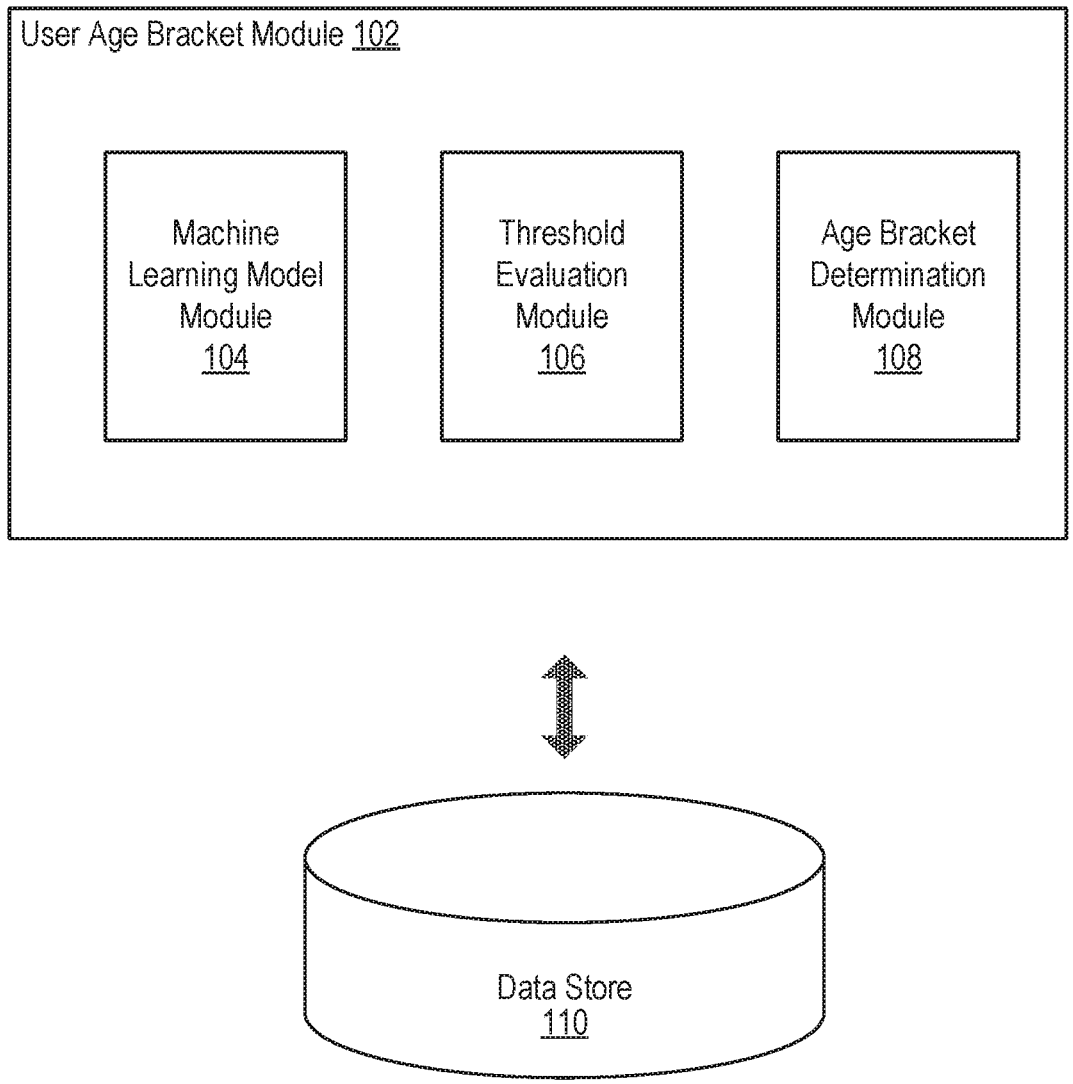
FIG. 1 illustrates a system including an example user age bracket module, according to an embodiment of the present technology.

The figures depict various embodiments of the disclosed technology for purposes of illustration only, wherein the figures use like reference numerals to identify like elements. One skilled in the art will readily recognize from the following discussion that alternative embodiments of the structures and methods illustrated in the figures can be employed without departing from the principles of the disclosed technology described herein.

DETAILED DESCRIPTION

Determining Age Brackets

Users often utilize computing devices for a wide variety of purposes. Users can use their computing devices to, for example, interact with one another, access media content, share media content, and create media content. In some cases, media content can be provided by users of a social networking system. The media content can include one or a combination of text, images, videos, and audio. The media content may be published to the social networking system for consumption by others.

Media content items can be maintained by a social networking system. Access to media content items can be provided to users through various pages, products, or other offerings of the social networking system. The users can constitute members of the social networking system who represent a wide spectrum of demographic profiles. For example, the users can fall into various age brackets, among other demographic categories. A determination of age brackets of users can allow the social networking system to determine the extent to which offerings are used by users of various age brackets. Further, the social networking system can attempt to optimize its offerings for users of various age brackets. However, conventional techniques specifically arising in the realm of computer technology to determine age brackets of users of a social networking system lack accuracy and reliability.

An improved approach rooted in computer technology overcomes the foregoing and other disadvantages associated with conventional approaches specifically arising in the realm of computer technology. Systems, methods, and computer readable media of the present technology can train a machine learning model to provide a score relating to preliminary determination of an age division for a user of a social networking system. The machine learning model can be a trained using a supervised learning technique in which various features can be used. The features can include, for example, a stated age of a user, a percentage of connections of the user on the social networking system that claim to be a same age as the user, etc. Other features also can be used. A score relating to a preliminary determination of an age division for a user can be based on user information including feature values relating to the user that is provided to the machine learning model. The score relating to a preliminary determination of an age division for a user can be evaluated against a threshold for a region associated with the user. If the score satisfies the threshold, then the user can be determined to be within the age division. If the stated age of the user is within the age division, the user is determined to be within an age bracket corresponding to the stated age of the user. If the stated age of the user is not within the age division, the user is determined to be within an age bracket of the age division including a largest number of connections of the user on the social networking system. More details regarding the present technology are described herein.

FIG. 1 illustrates an example system 100 including an example user age bracket module 102 configured to provide a determination of an age bracket for a user of a social networking system or any other type of community or group, according to an embodiment of the present technology. An age bracket can be a span of consecutive years of age (or ages) as indicated by a number of years. For example, an age bracket can be a span of two, three, four, five, or any suitable number of years of age. One or more age brackets can be included in an age division. An age division can be a division of ages based on a dividing age. For example, a first age division can be all ages equal to or less than a dividing age and a second age division can be all ages greater than the dividing age. While examples discussed herein can relate to a single dividing age on which two age divisions are based, the present technology applies equally to multiple dividing ages on which multiple age divisions can be based. Likewise, while certain age brackets may be discussed herein for purposes of illustration and understanding, the present technology also applies to other suitable age brackets. Determinations of age brackets for users as determined in accordance with the present technology can be compared with and validated by various data sources (e.g., census data). Significant variation from such data sources can prompt adjustments to and tuning of the techniques described herein. Many variations are possible. However, no embodiment of the present technology determines or infers an age bracket for a person who is twelve years of age or younger. Embodiments of the present technology can only determine or infer an age bracket for a person who is 13 years of age or older.

The user age bracket module 102 can include a machine learning model module 104, a threshold evaluation module 106, and an age bracket determination module 108. The components (e.g., modules, elements, steps, blocks, etc.) shown in this figure and all figures herein are exemplary only, and other implementations may include additional, fewer, integrated, or different components. Some components may not be shown so as not to obscure relevant details. In various embodiments, one or more of the functionalities described in connection with the user age bracket module 102 can be implemented in any suitable combinations.

The machine learning model module 104 can train a machine learning model to provide a score that is predictive of an age division for a user. A dividing age can be selected so that a first age division is equal to or less than the dividing age and a second age division is greater than the dividing age. The machine learning model can be a trained using a supervised learning technique in which various features can be used. The features can include, for example, a stated age of a user, a percentage of connections of the user on the social networking system that claim to be a same age as the user, as well as other features. In an evaluation stage, user information including feature values relating to a user can be provided to the machine learning model to provide a score relating to a preliminary determination of an age division for a user. Functionality of the machine learning model module 104 is described in more detail herein.

The threshold evaluation module 106 can obtain a score relating to a preliminary determination of an age division for a user. The score can be evaluated in relation to a threshold, such as a threshold score value. The threshold can be associated with a region that is associated with the user. For example, the region can be a country or other geolocation in which the user resides. In another example, the region can be a country or other geolocation assigned by the user during registration of the user with a social networking system. Each region can have a unique threshold score value. In some embodiments, if the possible range of values for a score relating to a preliminary determination of an age division for a user is between [0,1], the possible range of values for the threshold score is [0,1]. For example, a first region associated with a user can be associated with a first threshold score value. In this example, a machine learning model can provide a score relating to a preliminary determination of an age division for the user. Further to this example, if the score satisfies the first threshold score value, then the user can be determined to be within the age division. In some embodiments, different threshold score values for different regions can correspond to equal or similar accuracies in the determination of an age division for a user. For example, a first region associated can be associated with a first threshold score value and a second region associated can be associated with a second threshold score value that is different from the first threshold score value. In this example, the different threshold score values for the first region and the second region can correspond to a single level of accuracy in determining an age division for a user. Different threshold score values for different regions can reflect different behavioral patterns of users in the different regions as reflected in scores provided by a machine learning model trained to provide scores that are predictive of age divisions for users across the different regions. In some embodiments, threshold score values can be adjusted or tuned to achieve desired levels of accuracy in determination of an age division for users.

The age bracket determination module 108 can determine an age bracket for a user. If the stated age of the user is within a determined age division for the user, the user is determined to be within an age bracket corresponding to the stated age of the user. If the stated age of the user is not within the age division, the user is determined to be within an age bracket of the age division including a largest number of connections of the user on the social networking system. Functionality of the age bracket determination module 108 is described in more detail herein.

In some embodiments, the user age bracket module 102 can be implemented, in part or in whole, as software, hardware, or any combination thereof. In general, a module as discussed herein can be associated with software, hardware, or any combination thereof. In some implementations, one or more functions, tasks, and/or operations of modules can be carried out or performed by software routines, software processes, hardware, and/or any combination thereof. In some cases, the user age bracket module 102 can be, in part or in whole, implemented as software running on one or more computing devices or systems. For example, the user age bracket module 102 can be implemented as or within a dedicated application (e.g., app), a program, or an applet running on a user computing device or client computing system. In some instances, the user age bracket module 102 can be, in part or in whole, implemented within or configured to operate in conjunction or be integrated with client computing device, such as a user device 610 of FIG. 6. As another example, the user age bracket module 102 can be, in part or in whole, implemented within or configured to operate in conjunction or be integrated with a social networking system (or service), such as a social networking system 630 of FIG. 6. It should be understood that many variations are possible.

The system 100 can include a data store 110 configured to store and maintain various types of data, such as data relating to support of and operation of the user age bracket module 102. The data store 110 also can maintain other information associated with a social networking system. The information associated with the social networking system can include data about users, social connections, social interactions, locations of connections, and media content items. As shown in the example system 100, the user age bracket module 102 can be configured to communicate and/or operate with the data store 110. In some embodiments, the data store 110 can be implemented on a computing device that implements the user age bracket module 102.

Figure 2:
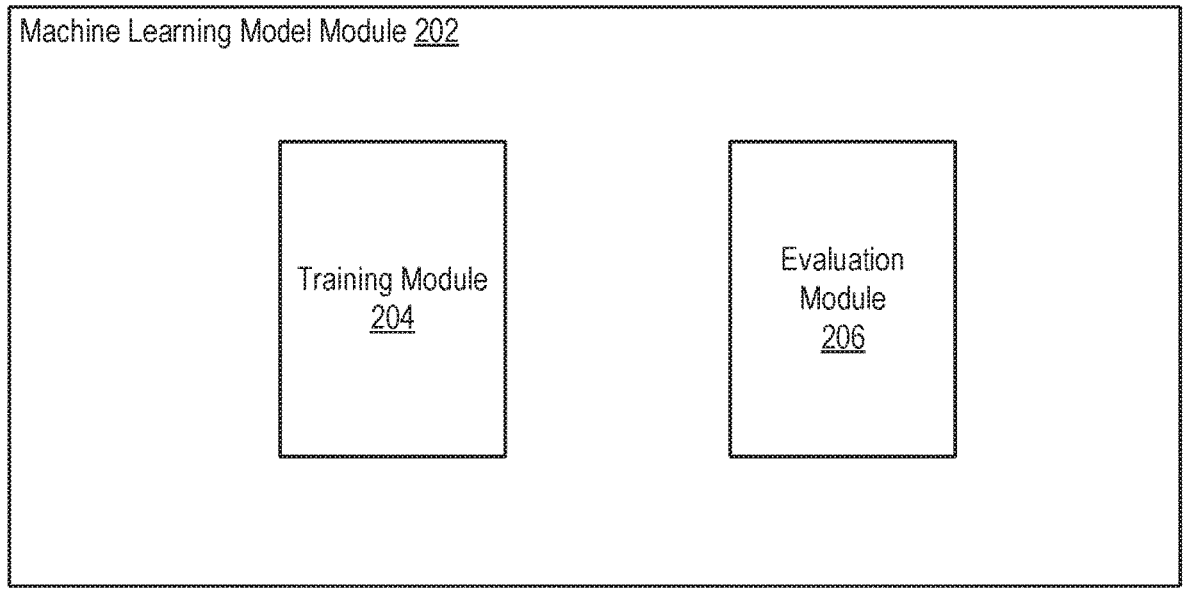
FIG. 2 illustrates an example machine learning model module, according to an embodiment of the present technology.

FIG. 2 illustrates an example machine learning model module 202, according to an embodiment of the present technology. In some embodiments, the machine learning model module 104 of FIG. 1 can be implemented with the machine learning model module 202. The machine learning model module 202 can include a training module 204 and an evaluation module 206.

The training module 204 can obtain training data to train a machine learning model to provide information that is predictive of an age division for a user. In some embodiments, training of the machine learning model can employ a supervised learning technique. In some embodiments, the training data can include profile information regarding users as well as labels. In some embodiments, the users can be members of a social networking system or any other type of community or group, such as an online community or group. The profile information for a user can include, for example, identifying and demographic information of the user. For example, the training data can include one or more of a profile image of a user, a job at which the user is employed, educational institutions or schools the user has attended, and a stated age of the user. In some embodiments, training data associated with users associated with different regions can be used to train the machine learning model. Training data associated with users associated with different regions can allow the machine learning model to more accurately predict age divisions for users in different regions. In some embodiments, one or more portions of the training data can be reserved for testing purposes. For example, the testing purposes can relate to determining a threshold, such as a threshold score value, and to determining accuracy in predicting an age division for a user. New training data can be continuously or periodically provided to the machine learning model to update and retrain the machine learning model to enhance its predictive capabilities and performance.

The training data also can include labels indicating age category information regarding users associated with the training data. A label for a user can be provided by manual or non-manual inspection of the training data associated with a user. In some embodiments, a label can indicate whether a user is within a certain age division that is defined by one or more dividing ages. In some embodiments, two age divisions can be based on a single dividing age. For example, a first age division can be equal to or less than a dividing age and a second age division can be greater than the dividing age. In this example, a label can indicate whether a user is within the first age division or within the second age division. In one instance, a dividing age can be 18 years of age, and a first age division can span years of age equal to or less than 18 and a second age division can span years of age greater than 18. Other dividing ages are possible. In some embodiments, more than two age divisions can be based on a plurality of dividing ages.

Various features can be used for training the machine learning model. In some embodiments, the features can include, for example, a stated age of a user and a percentage of connections of the user having stated ages that are the same as the stated age of the user. The connections of the user can include, for example, friends, relatives, followers, etc. of the user on a social networking system. A stated age of a user or connection can be determined based on, for example, an age of the user or connection as provided by them at a time when the user or connection registered an account with a social networking system. In some embodiments, while an age of a connection of a user may be discussed herein as based on a stated age of the connection, the present technology also applies to determination of an age bracket for the connection based on techniques to predict an age bracket as provided by the user age bracket module 102. In some embodiments, the features also can include, for example, a histogram of percentages of connections of a user that are selected ages or within selected age brackets. In some embodiments, the features also can include, for example, a histogram of percentages of connections of a user associated with a region that are selected ages or within selected age brackets divided by a histogram of percentages of connections of a typical person in the region that are the selected ages or within the selected age brackets. The feature relating to a histogram of percentages of connections of a user associated with a region divided by a histogram of percentages of connections of a typical person in the region can enhance an ability of the machine learning model to account for uniqueness of the user in comparison to a typical person in the region. By accounting for user behavior in various regions, the user age bracket module 102 can implement a single machine learning model to predict age divisions for users in different regions. In some embodiments, a plurality of machine learning models can be implemented for users in a plurality of regions so that each region is associated with a corresponding machine learning model reflective of user behavior in that region.

The evaluation module 206 can obtain user information including features values associated with a user for which a predicted age division is to be determined. The feature values can be values relating to the features discussed in relation to the training module 204. In some embodiments, the feature values can be provided by a data store, such as the data store 110, that maintains information about the user, connections of the user, and interactions between the user and the connections on a social networking system. Based on the features values associated with the user, the evaluation module 206 can cause the machine learning model to provide a score relating to a preliminary determination of an age division for the user.

Figure 3:
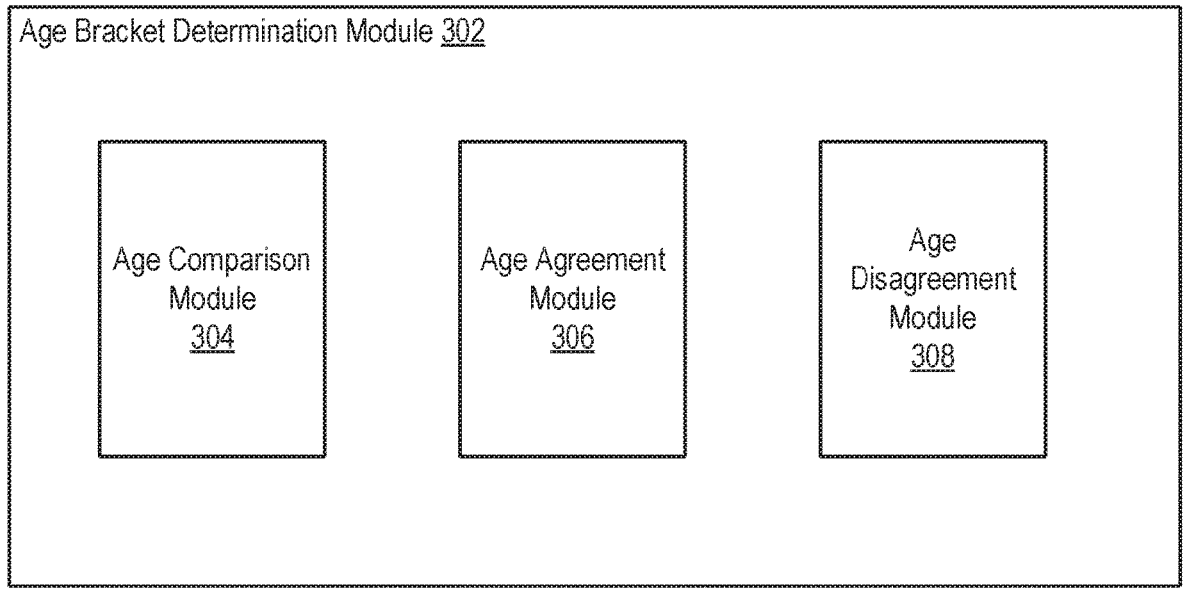
FIG. 3 illustrates an example age bracket determination module, according to an embodiment of the present technology.

FIG. 3 illustrates an example age bracket determination module 302, according to an embodiment of the present technology. In some embodiments, the age bracket determination module 108 of FIG. 1 can be implemented with the age bracket determination module 302. The age bracket determination module 302 can include an age comparison module 304, an age agreement module 306, and an age disagreement module 308.

The age comparison module 304 can obtain a determination of an age division for a user. The age comparison module 304 can compare the age division for a user with a stated age of the user. The age comparison module 304 can determine that the stated age of the user is within the age division. Alternatively, the age comparison module 204 can determine that the stated age of the user is not within the age division.

A determination of an age bracket for a user can be based on the determination of the age comparison module 304. In some embodiments, the age bracket can be one or more age brackets within the age division determined for the user. For example, a first age division and a second age division can be based on a dividing age. In one instance, a dividing age can be 18 years of age, and a first age division can span years of age equal to or less than 18 and a second age division can span years of age greater than 18. In this instance, with respect to the first age division, a first age bracket can span years of age less than or equal to 16 and a second age bracket can span years of age from 17 to 18. Further to this instance, with respect to the second age division, a first age bracket can span years of age from 19 to 22, a second age bracket can span years of age from 23 to 31, and a third age bracket can span years of age from 32. In various embodiments, a number of age divisions, a number of age brackets within each age division, and a span of years of age associated each age bracket can vary in different implementations. As mentioned herein, embodiments of the present technology can only determine or infer an age bracket for a person who is 13 years of age or older. The present technology does not determine or infer an age bracket for a person who is twelve years of age or younger.

If the stated age of the user is within the age division, the age agreement module 306 in response can determine an age bracket within the age division including the stated age of the user. The determined age bracket can be assigned as the age bracket for the user. For example, assume the age division for a user is less than or equal to 18 years of age and the age division is associated with a first age bracket that spans years of age less than or equal to 16 and a second age bracket that spans years of age from 17 to 18. In this example, if the stated age of the user is 17 years of age, then the age agreement module 306 can determine that the user is within the second age bracket that spans years of age from 17 to 18.

If the stated age of the user is not within the age division, the age agreement module 306 in response can determine an age bracket within the age division including a largest number of connections of the user. The determined age bracket can be deemed to be the age bracket for the user. For example, assume the age division for a user is less than or equal to 18 years of age and the age division is associated with a first age bracket that spans years of age less than or equal to 16 and a second age bracket that spans years of age from 17 to 18. In this example, if the stated age of the user is 19 years of age, then the age disagreement module 308 can obtain data regarding a number of connections of the user that are within the first age bracket and a number of connections of the user that are within the second age bracket. Further to this example, the age bracket between the first age bracket and the second age bracket that has the highest number of connections of the user can be determined. The age disagreement module 308 can determine that the user is within the age bracket associated with the highest number of connections of the user. In some embodiments, each count of a connection within an age bracket can be weighted by various factors, such as an amount of interaction between the user and the connection on a social networking system.

Figure 4:
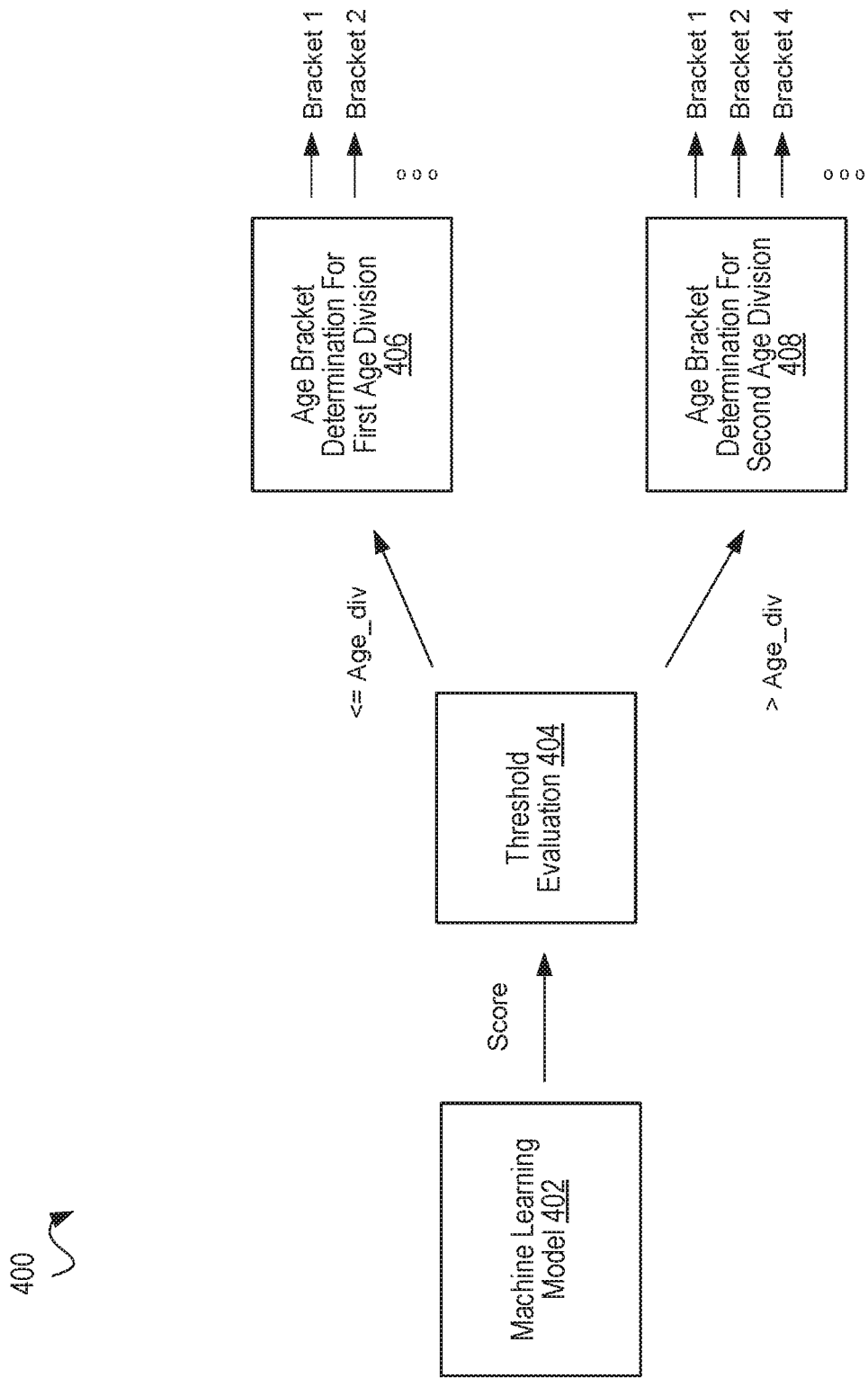
FIG. 4 illustrates an example functional block diagram to determine an age bracket for a user, according to an embodiment of the present technology.

FIG. 4 illustrates an example functional block diagram 400 to determine an age bracket for a user, according to an embodiment of the present technology. The functional block diagram 400 can include a machine learning model 402 that is trained to provide a score relating to a preliminary determination of an age division for a user. In some embodiments, the age division can be one of two age divisions based on a dividing age. In the example shown, the dividing age is indicated as Age_div, on which a first age division and a second age division are based. The first age division spans years of age that are equal to or less than Age_div. The second age division spans years of age that are greater than Age_div. In some embodiments, the machine learning model 402 can be trained with training data associated with users of a social networking system. For each user associated with the training data, the training data can include one or more profile images, employment information, schools and educational history, and a stated age. The training data can be provided by the user and maintained in a data store of a social networking system. The training data also can include a label for each user that indicates an age division for the user. The label for each user can be based on manual review of the training data for the user. The machine learning model 402 can be based on various features, such as a stated age of a user and a percentage of connections of the user having stated ages that are the same as the stated age of the user. In an evaluation stage, feature values for a user for whom an age bracket is to be determined are provided to the machine learning model 402. The machine learning model 402 can generate a score for the user relating to a preliminary determination of an age division based on the feature values.

The score for the user can be provided for a threshold evaluation 404. The threshold evaluation 404 can compare the score relating to a preliminary determination of an age division for the user with a threshold, such as a threshold score value. The threshold can be associated with a region that is associated with the user. If the score for the user satisfies the threshold, the threshold evaluation 404 can result in a determination that the user is within the age division. In the example shown, if a score for a user relating to a preliminary determination of a first age division satisfies a threshold associated with a region associated with the user, the user can be determined to be within the first age division. The user can be determined to be within the second age division in a similar manner.

An age bracket determination for first age division 406 can determine an age bracket for a user within the first age division. As shown, the first age division can include a plurality of age brackets. If the first age division includes the stated age of the user, the age bracket determination for first age division 406 can determine an age bracket within the first age division that includes the stated age of the user. In that event, the determined age bracket can be assigned as the age bracket for the user. If the first age division does not include the stated age of the user, the age bracket determination for first age division 406 can determine an age bracket among age brackets within the first age division that has the highest number of connections of the user. In that event, the determined age bracket can be assigned as the age bracket for the user. An age bracket determination for second age division 408 can determine an age bracket for a user within the second age division in a similar manner. The functionality of the components in the functional block diagram 400 is described in more detail herein in relation to the user age bracket module 102. The determination of age brackets for users of a social networking system can allow the social networking system to recognize and respond to behavioral patterns and engagement of users in various age brackets. For example, the determination of age brackets for users allows a social networking system to determine what products and offerings, or portions thereof, are accessed or consumed by users in various age brackets. As a result, product strategies can be developed to optimize engagement with the social networking system across all or selected age brackets. In some embodiments, engagement by users in different age brackets across one or more products can be compared. For example, users in a first age bracket that use a product can be compared with users in a second age bracket that use the same product. As another example, users in an age bracket that use a first product can be compared with users in the same age bracket that use a second product. The comparisons can allow a system supporting the products, such as a social networking system, to optimize one or more products for users in various age brackets. Such optimization can enhance engagement by users in different age brackets across one or more products. Likewise, determination of age brackets for users in accordance with the present technology can facilitate delivery of targeted advertising campaigns. For example, an advertiser may wish to focus presentation of advertising to users of a particular age range. The determination of age brackets for users can allow the advertiser to selectively direct advertising to users in age brackets that are relevant to the strategy of a particular advertising campaign.

FIG. 5 illustrates an example method 500 relating to determination of an age bracket for a user, according to an embodiment of the present technology. It should be appreciated that there can be additional, fewer, or alternative steps performed in similar or alternative orders, or in parallel, in accordance with the various embodiments and features discussed herein unless otherwise stated.

At block 502, the method 500 can apply a machine learning model to predict an age division for a user based on user information. At block 504, the method 500 can determine an age bracket within the age division including a largest number of connections of the user. At block 506, the method 500 can assign the determined age bracket for the user. Other suitable techniques that incorporate various features and embodiments of the present technology are possible.

It is contemplated that there can be many other uses, applications, features, possibilities, and variations associated with various embodiments of the present technology. For example, users can choose whether or not to opt-in to utilize the present technology. The present technology also can ensure that various privacy settings, preferences, and configurations are maintained and can prevent private information from being divulged. In another example, various embodiments of the present technology can learn, improve, and be refined over time.

Social Networking System—Example Implementation

Figure 6:
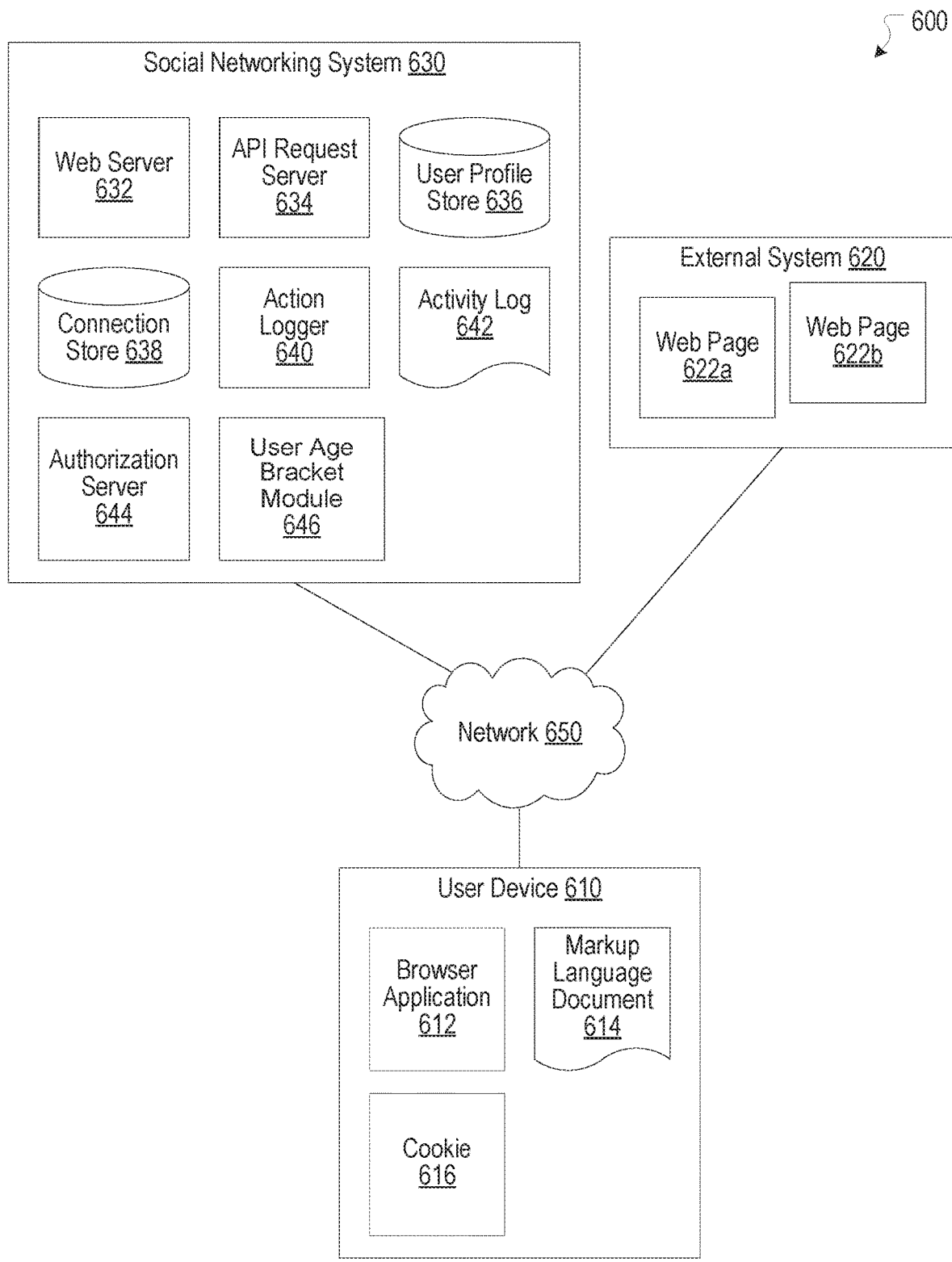
FIG. 6 illustrates a network diagram of an example system that can be utilized in various scenarios, according to an embodiment of the present technology.

FIG. 6 illustrates a network diagram of an example system 600 that can be utilized in various scenarios, in accordance with an embodiment of the present technology. The system 600 includes one or more user devices 610, one or more external systems 620, a social networking system (or service) 630, and a network 655. In an embodiment, the social networking service, provider, and/or system discussed in connection with the embodiments described above may be implemented as the social networking system 630. For purposes of illustration, the embodiment of the system 600, shown by FIG. 6, includes a single external system 620 and a single user device 610. However, in other embodiments, the system 600 may include more user devices 610 and/or more external systems 620. In certain embodiments, the social networking system 630 is operated by a social network provider, whereas the external systems 620 are separate from the social networking system 630 in that they may be operated by different entities. In various embodiments, however, the social networking system 630 and the external systems 620 operate in conjunction to provide social networking services to users (or members) of the social networking system 630. In this sense, the social networking system 630 provides a platform or backbone, which other systems, such as external systems 620, may use to provide social networking services and functionalities to users across the Internet.

The user device 610 comprises one or more computing devices that can receive input from a user and transmit and receive data via the network 655. In one embodiment, the user device 610 is a conventional computer system executing, for example, a Microsoft Windows compatible operating system (OS), Apple OS X, and/or a Linux distribution. In another embodiment, the user device 610 can be a device having computer functionality, such as a smart-phone, a tablet, a personal digital assistant (PDA), a mobile telephone, etc. The user device 610 is configured to communicate via the network 655. The user device 610 can execute an application, for example, a browser application that allows a user of the user device 610 to interact with the social networking system 630. In another embodiment, the user device 610 interacts with the social networking system 630 through an application programming interface (API) provided by the native operating system of the user device 610, such as iOS and ANDROID. The user device 610 is configured to communicate with the external system 620 and the social networking system 630 via the network 655, which may comprise any combination of local area and/or wide area networks, using wired and/or wireless communication systems.

In one embodiment, the network 655 uses standard communications technologies and protocols. Thus, the network 655 can include links using technologies such as Ethernet, 802.11, worldwide interoperability for microwave access (WiMAX), 3G, 4G, CDMA, GSM, LTE, digital subscriber line (DSL), etc. Similarly, the networking protocols used on the network 655 can include multiprotocol label switching (MPLS), transmission control protocol/Internet protocol (TCP/IP), User Datagram Protocol (UDP), hypertext transport protocol (HTTP), simple mail transfer protocol (SMTP), file transfer protocol (FTP), and the like. The data exchanged over the network 655 can be represented using technologies and/or formats including hypertext markup language (HTML) and extensible markup language (XML). In addition, all or some links can be encrypted using conventional encryption technologies such as secure sockets layer (SSL), transport layer security (TLS), and Internet Protocol security (IPsec).

In one embodiment, the user device 610 may display content from the external system 620 and/or from the social networking system 630 by processing a markup language document 614 received from the external system 620 and from the social networking system 630 using a browser application 612. The markup language document 614 identifies content and one or more instructions describing formatting or presentation of the content. By executing the instructions included in the markup language document 614, the browser application 612 displays the identified content using the format or presentation described by the markup language document 614. For example, the markup language document 614 includes instructions for generating and displaying a web page having multiple frames that include text and/or image data retrieved from the external system 620 and the social networking system 630. In various embodiments, the markup language document 614 comprises a data file including extensible markup language (XML) data, extensible hypertext markup language (XHTML) data, or other markup language data. Additionally, the markup language document 614 may include JavaScript Object Notation (JSON) data, JSON with padding (JSONP), and JavaScript data to facilitate data-interchange between the external system 620 and the user device 610. The browser application 612 on the user device 610 may use a JavaScript compiler to decode the markup language document 614.

The markup language document 614 may also include, or link to, applications or application frameworks such as FLASH™ or Unity™ applications, the SilverLight™ application framework, etc.

In one embodiment, the user device 610 also includes one or more cookies 616 including data indicating whether a user of the user device 610 is logged into the social networking system 630, which may enable modification of the data communicated from the social networking system 630 to the user device 610.

The external system 620 includes one or more web servers that include one or more web pages 622a, 622b, which are communicated to the user device 610 using the network 655. The external system 620 is separate from the social networking system 630. For example, the external system 620 is associated with a first domain, while the social networking system 630 is associated with a separate social networking domain. Web pages 622a, 622b, included in the external system 620, comprise markup language documents 614 identifying content and including instructions specifying formatting or presentation of the identified content.

The social networking system 630 includes one or more computing devices for a social network, including a plurality of users, and providing users of the social network with the ability to communicate and interact with other users of the social network. In some instances, the social network can be represented by a graph, i.e., a data structure including edges and nodes. Other data structures can also be used to represent the social network, including but not limited to databases, objects, classes, meta elements, files, or any other data structure. The social networking system 630 may be administered, managed, or controlled by an operator. The operator of the social networking system 630 may be a human being, an automated application, or a series of applications for managing content, regulating policies, and collecting usage metrics within the social networking system 630. Any type of operator may be used.

Users may join the social networking system 630 and then add connections to any number of other users of the social networking system 630 to whom they desire to be connected. As used herein, the term "friend" refers to any other user of the social networking system 630 to whom a user has formed a connection, association, or relationship via the social networking system 630. For example, in an embodiment, if users in the social networking system 630 are represented as nodes in the social graph, the term "friend" can refer to an edge formed between and directly connecting two user nodes.

Connections may be added explicitly by a user or may be automatically created by the social networking system 630 based on common characteristics of the users (e.g., users who are alumni of the same educational institution). For example, a first user specifically selects a particular other user to be a friend. Connections in the social networking system 630 are usually in both directions, but need not be, so the terms "user" and "friend" depend on the frame of reference. Connections between users of the social networking system 630 are usually bilateral ("two-way"), or "mutual," but connections may also be unilateral, or "one-way." For example, if Bob and Joe are both users of the social networking system 630 and connected to each other, Bob and Joe are each other's connections. If, on the other hand, Bob wishes to connect to Joe to view data communicated to the social networking system 630 by Joe, but Joe does not wish to form a mutual connection, a unilateral connection may be established. The connection between users may be a direct connection; however, some embodiments of the social networking system 630 allow the connection to be indirect via one or more levels of connections or degrees of separation.

In addition to establishing and maintaining connections between users and allowing interactions between users, the social networking system 630 provides users with the ability to take actions on various types of items supported by the social networking system 630. These items may include groups or networks (i.e., social networks of people, entities, and concepts) to which users of the social networking system 630 may belong, events or calendar entries in which a user might be interested, computer-based applications that a user may use via the social networking system 630, transactions that allow users to buy or sell items via services provided by or through the social networking system 630, and interactions with advertisements that a user may perform on or off the social networking system 630. These are just a few examples of the items upon which a user may act on the social networking system 630, and many others are possible. A user may interact with anything that is capable of being represented in the social networking system 630 or in the external system 620, separate from the social networking system 630, or coupled to the social networking system 630 via the network 655.

The social networking system 630 is also capable of linking a variety of entities. For example, the social networking system 630 enables users to interact with each other as well as external systems 620 or other entities through an API, a web service, or other communication channels. The social networking system 630 generates and maintains the "social graph" comprising a plurality of nodes interconnected by a plurality of edges. Each node in the social graph may represent an entity that can act on another node and/or that can be acted on by another node. The social graph may include various types of nodes. Examples of types of nodes include users, non-person entities, content items, web pages, groups, activities, messages, concepts, and any other things that can be represented by an object in the social networking system 630. An edge between two nodes in the social graph may represent a particular kind of connection, or association, between the two nodes, which may result from node relationships or from an action that was performed by one of the nodes on the other node. In some cases, the edges between nodes can be weighted. The weight of an edge can represent an attribute associated with the edge, such as a strength of the connection or association between nodes. Different types of edges can be provided with different weights. For example, an edge created when one user "likes" another user may be given one weight, while an edge created when a user befriends another user may be given a different weight.

As an example, when a first user identifies a second user as a friend, an edge in the social graph is generated connecting a node representing the first user and a second node representing the second user. As various nodes relate or interact with each other, the social networking system 630 modifies edges connecting the various nodes to reflect the relationships and interactions.

The social networking system 630 also includes user-generated content, which enhances a user's interactions with the social networking system 630. User-generated content may include anything a user can add, upload, send, or "post" to the social networking system 630. For example, a user communicates posts to the social networking system 630 from a user device 610. Posts may include data such as status updates or other textual data, location information, images such as photos, videos, links, music or other similar data and/or media. Content may also be added to the social networking system 630 by a third party. Content "items" are represented as objects in the social networking system 630. In this way, users of the social networking system 630 are encouraged to communicate with each other by posting text and content items of various types of media through various communication channels. Such communication increases the interaction of users with each other and increases the frequency with which users interact with the social networking system 630.

The social networking system 630 includes a web server 632, an API request server 634, a user profile store 636, a connection store 638, an action logger 640, an activity log 642, and an authorization server 644. In an embodiment of the invention, the social networking system 630 may include additional, fewer, or different components for various applications. Other components, such as network interfaces, security mechanisms, load balancers, failover servers, management and network operations consoles, and the like are not shown so as to not obscure the details of the system.

The user profile store 636 maintains information about user accounts, including biographic, demographic, and other types of descriptive information, such as work experience, educational history, hobbies or preferences, location, and the like that has been declared by users or inferred by the social networking system 630. This information is stored in the user profile store 636 such that each user is uniquely identified. The social networking system 630 also stores data describing one or more connections between different users in the connection store 638. The connection information may indicate users who have similar or common work experience, group memberships, hobbies, or educational history. Additionally, the social networking system 630 includes user-defined connections between different users, allowing users to specify their relationships with other users. For example, user-defined connections allow users to generate relationships with other users that parallel the users' real-life relationships, such as friends, co-workers, partners, and so forth. Users may select from predefined types of connections, or define their own connection types as needed. Connections with other nodes in the social networking system 630, such as non-person entities, buckets, cluster centers, images, interests, pages, external systems, concepts, and the like are also stored in the connection store 638.

The social networking system 630 maintains data about objects with which a user may interact. To maintain this data, the user profile store 636 and the connection store 638 store instances of the corresponding type of objects maintained by the social networking system 630. Each object type has information fields that are suitable for storing information appropriate to the type of object. For example, the user profile store 636 contains data structures with fields suitable for describing a user's account and information related to a user's account. When a new object of a particular type is created, the social networking system 630 initializes a new data structure of the corresponding type, assigns a unique object identifier to it, and begins to add data to the object as needed. This might occur, for example, when a user becomes a user of the social networking system 630, the social networking system 630 generates a new instance of a user profile in the user profile store 636, assigns a unique identifier to the user account, and begins to populate the fields of the user account with information provided by the user.

The connection store 638 includes data structures suitable for describing a user's connections to other users, connections to external systems 620 or connections to other entities. The connection store 638 may also associate a connection type with a user's connections, which may be used in conjunction with the user's privacy setting to regulate access to information about the user. In an embodiment of the invention, the user profile store 636 and the connection store 638 may be implemented as a federated database.

Data stored in the connection store 638, the user profile store 636, and the activity log 642 enables the social networking system 630 to generate the social graph that uses nodes to identify various objects and edges connecting nodes to identify relationships between different objects. For example, if a first user establishes a connection with a second user in the social networking system 630, user accounts of the first user and the second user from the user profile store 636 may act as nodes in the social graph. The connection between the first user and the second user stored by the connection store 638 is an edge between the nodes associated with the first user and the second user. Continuing this example, the second user may then send the first user a message within the social networking system 630. The action of sending the message, which may be stored, is another edge between the two nodes in the social graph representing the first user and the second user. Additionally, the message itself may be identified and included in the social graph as another node connected to the nodes representing the first user and the second user.

In another example, a first user may tag a second user in an image that is maintained by the social networking system 630 (or, alternatively, in an image maintained by another system outside of the social networking system 630). The image may itself be represented as a node in the social networking system 630. This tagging action may create edges between the first user and the second user as well as create an edge between each of the users and the image, which is also a node in the social graph. In yet another example, if a user confirms attending an event, the user and the event are nodes obtained from the user profile store 636, where the attendance of the event is an edge between the nodes that may be retrieved from the activity log 642. By generating and maintaining the social graph, the social networking system 630 includes data describing many different types of objects and the interactions and connections among those objects, providing a rich source of socially relevant information.

The web server 632 links the social networking system 630 to one or more user devices 610 and/or one or more external systems 620 via the network 655. The web server 632 serves web pages, as well as other web-related content, such as Java, JavaScript, Flash, XML, and so forth. The web server 632 may include a mail server or other messaging functionality for receiving and routing messages between the social networking system 630 and one or more user devices 610. The messages can be instant messages, queued messages (e.g., email), text and SMS messages, or any other suitable messaging format.

The API request server 634 allows one or more external systems 620 and user devices 610 to call access information from the social networking system 630 by calling one or more API functions. The API request server 634 may also allow external systems 620 to send information to the social networking system 630 by calling APIs. The external system 620, in one embodiment, sends an API request to the social networking system 630 via the network 655, and the API request server 634 receives the API request. The API request server 634 processes the request by calling an API associated with the API request to generate an appropriate response, which the API request server 634 communicates to the external system 620 via the network 655. For example, responsive to an API request, the API request server 634 collects data associated with a user, such as the user's connections that have logged into the external system 620, and communicates the collected data to the external system 620. In another embodiment, the user device 610 communicates with the social networking system 630 via APIs in the same manner as external systems 620.

The action logger 640 is capable of receiving communications from the web server 632 about user actions on and/or off the social networking system 630. The action logger 640 populates the activity log 642 with information about user actions, enabling the social networking system 630 to discover various actions taken by its users within the social networking system 630 and outside of the social networking system 630. Any action that a particular user takes with respect to another node on the social networking system 630 may be associated with each user's account, through information maintained in the activity log 642 or in a similar database or other data repository. Examples of actions taken by a user within the social networking system 630 that are identified and stored may include, for example, adding a connection to another user, sending a message to another user, reading a message from another user, viewing content associated with another user, attending an event posted by another user, posting an image, attempting to post an image, or other actions interacting with another user or another object. When a user takes an action within the social networking system 630, the action is recorded in the activity log 642. In one embodiment, the social networking system 630 maintains the activity log 642 as a database of entries. When an action is taken within the social networking system 630, an entry for the action is added to the activity log 642. The activity log 642 may be referred to as an action log.

Additionally, user actions may be associated with concepts and actions that occur within an entity outside of the social networking system 630, such as an external system 620 that is separate from the social networking system 630. For example, the action logger 640 may receive data describing a user's interaction with an external system 620 from the web server 632. In this example, the external system 620 reports a user's interaction according to structured actions and objects in the social graph.

Other examples of actions where a user interacts with an external system 620 include a user expressing an interest in an external system 620 or another entity, a user posting a comment to the social networking system 630 that discusses an external system 620 or a web page 622a within the external system 620, a user posting to the social networking system 630 a Uniform Resource Locator (URL) or other identifier associated with an external system 620, a user attending an event associated with an external system 620, or any other action by a user that is related to an external system 620. Thus, the activity log 642 may include actions describing interactions between a user of the social networking system 630 and an external system 620 that is separate from the social networking system 630.

The authorization server 644 enforces one or more privacy settings of the users of the social networking system 630. A privacy setting of a user determines how particular information associated with a user can be shared. The privacy setting comprises the specification of particular information associated with a user and the specification of the entity or entities with whom the information can be shared. Examples of entities with which information can be shared may include other users, applications, external systems 620, or any entity that can potentially access the information. The information that can be shared by a user comprises user account information, such as profile photos, phone numbers associated with the user, user's connections, actions taken by the user such as adding a connection, changing user profile information, and the like.

The privacy setting specification may be provided at different levels of granularity. For example, the privacy setting may identify specific information to be shared with other users; the privacy setting identifies a work phone number or a specific set of related information, such as, personal information including profile photo, home phone number, and status. Alternatively, the privacy setting may apply to all the information associated with the user. The specification of the set of entities that can access particular information can also be specified at various levels of granularity. Various sets of entities with which information can be shared may include, for example, all friends of the user, all friends of friends, all applications, or all external systems 620. One embodiment allows the specification of the set of entities to comprise an enumeration of entities. For example, the user may provide a list of external systems 620 that are allowed to access certain information. Another embodiment allows the specification to comprise a set of entities along with exceptions that are not allowed to access the information. For example, a user may allow all external systems 620 to access the user's work information, but specify a list of external systems 620 that are not allowed to access the work information. Certain embodiments call the list of exceptions that are not allowed to access certain information a "block list". External systems 620 belonging to a block list specified by a user are blocked from accessing the information specified in the privacy setting. Various combinations of granularity of specification of information, and granularity of specification of entities, with which information is shared are possible. For example, all personal information may be shared with friends whereas all work information may be shared with friends of friends.

The authorization server 644 contains logic to determine if certain information associated with a user can be accessed by a user's friends, external systems 620, and/or other applications and entities. The external system 620 may need authorization from the authorization server 644 to access the user's more private and sensitive information, such as the user's work phone number. Based on the user's privacy settings, the authorization server 644 determines if another user, the external system 620, an application, or another entity is allowed to access information associated with the user, including information about actions taken by the user.

In some embodiments, the social networking system 630 can include a user age bracket module 646. The user age bracket module 646 can be implemented with the user age bracket module 102, as discussed in more detail herein. In some embodiments, one or more functionalities of the user age bracket module 646 can be implemented in the user device 610.

Hardware Implementation

Figure 7:
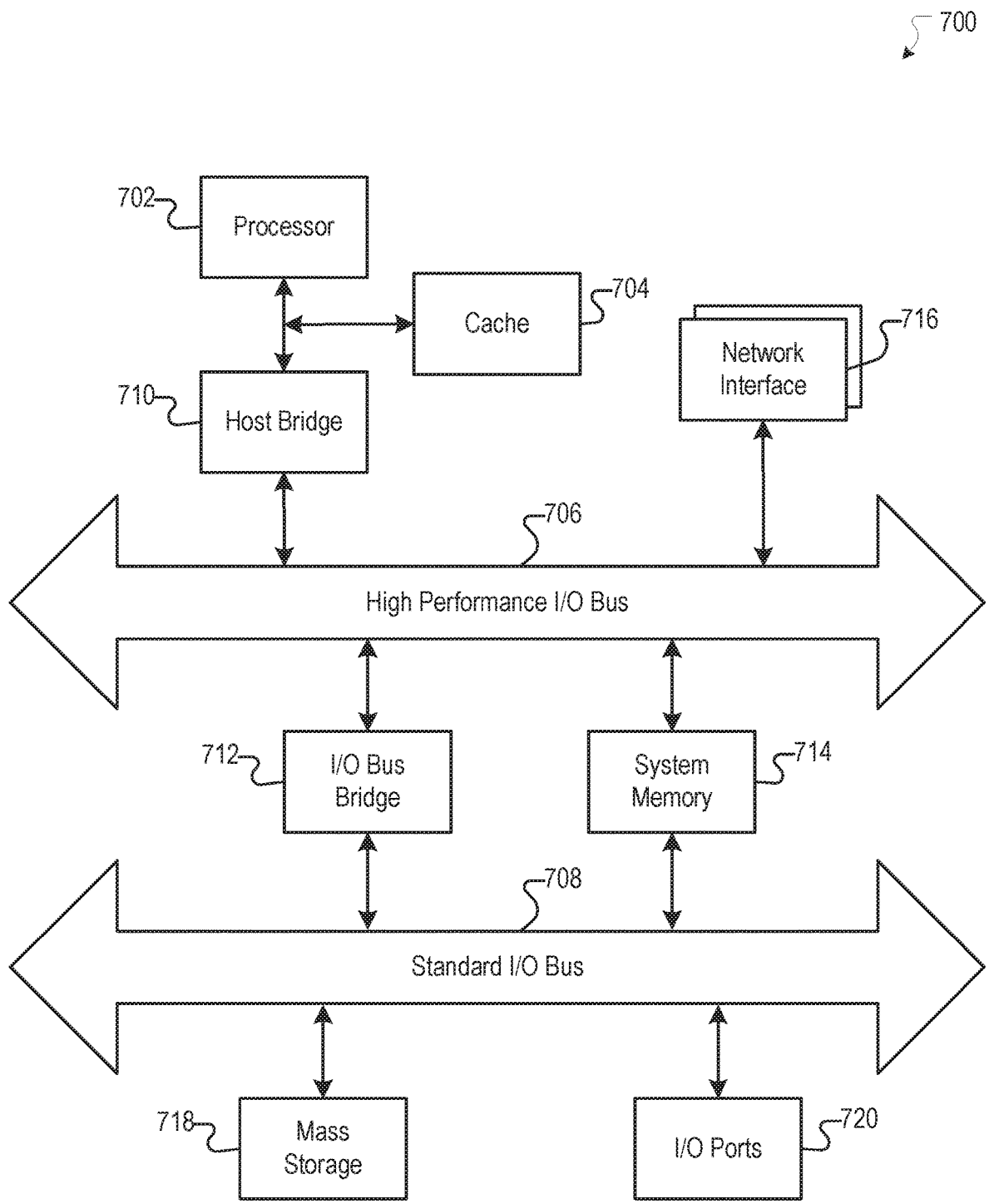
FIG. 7 illustrates an example of a computer system that can be utilized in various scenarios, according to an embodiment of the present technology.

The foregoing processes and features can be implemented by a wide variety of machine and computer system architectures and in a wide variety of network and computing environments. FIG. 7 illustrates an example of a computer system 700 that may be used to implement one or more of the embodiments described herein in accordance with an embodiment of the invention. The computer system 700 includes sets of instructions for causing the computer system 700 to perform the processes and features discussed herein. The computer system 700 may be connected (e.g., networked) to other machines. In a networked deployment, the computer system 700 may operate in the capacity of a server machine or a client machine in a client-server network environment, or as a peer machine in a peer-to-peer (or distributed) network environment. In an embodiment of the invention, the computer system 700 may be the social networking system 630, the user device 610, and the external system 720, or a component thereof. In an embodiment of the invention, the computer system 700 may be one server among many that constitutes all or part of the social networking system 630.

The computer system 700 includes a processor 702, a cache 704, and one or more executable modules and drivers, stored on a computer-readable medium, directed to the processes and features described herein. Additionally, the computer system 700 includes a high performance input/output (I/O) bus 706 and a standard I/O bus 708. A host bridge 710 couples processor 702 to high performance I/O bus 706, whereas I/O bus bridge 712 couples the two buses 706 and 708 to each other. A system memory 714 and one or more network interfaces 716 couple to high performance I/O bus 706. The computer system 700 may further include video memory and a display device coupled to the video memory (not shown). Mass storage 718 and I/O ports 720 couple to the standard I/O bus 708. The computer system 700 may optionally include a keyboard and pointing device, a display device, or other input/output devices (not shown) coupled to the standard I/O bus 708. Collectively, these elements are intended to represent a broad category of computer hardware systems, including but not limited to computer systems based on the x86-compatible processors manufactured by Intel Corporation of Santa Clara, Calif., and the x86-compatible processors manufactured by Advanced Micro Devices (AMD), Inc., of Sunnyvale, Calif., as well as any other suitable processor.

An operating system manages and controls the operation of the computer system 700, including the input and output of data to and from software applications (not shown). The operating system provides an interface between the software applications being executed on the system and the hardware components of the system. Any suitable operating system may be used, such as the LINUX Operating System, the Apple Macintosh Operating System, available from Apple Computer Inc. of Cupertino, Calif., UNIX operating systems, Microsoft® Windows® operating systems, BSD operating systems, and the like. Other implementations are possible.

The elements of the computer system 700 are described in greater detail below. In particular, the network interface 716 provides communication between the computer system 700 and any of a wide range of networks, such as an Ethernet (e.g., IEEE 802.3) network, a backplane, etc. The mass storage 718 provides permanent storage for the data and programming instructions to perform the above-described processes and features implemented by the respective computing systems identified above, whereas the system memory 714 (e.g., DRAM) provides temporary storage for the data and programming instructions when executed by the processor 702. The I/O ports 720 may be one or more serial and/or parallel communication ports that provide communication between additional peripheral devices, which may be coupled to the computer system 700.

The computer system 700 may include a variety of system architectures, and various components of the computer system 700 may be rearranged. For example, the cache 704 may be on-chip with processor 702. Alternatively, the cache 704 and the processor 702 may be packed together as a "processor module", with processor 702 being referred to as the "processor core". Furthermore, certain embodiments of the invention may neither require nor include all of the above components. For example, peripheral devices coupled to the standard I/O bus 708 may couple to the high performance I/O bus 706. In addition, in some embodiments, only a single bus may exist, with the components of the computer system 700 being coupled to the single bus. Moreover, the computer system 700 may include additional components, such as additional processors, storage devices, or memories.

In general, the processes and features described herein may be implemented as part of an operating system or a specific application, component, program, object, module, or series of instructions referred to as "programs". For example, one or more programs may be used to execute specific processes described herein. The programs typically comprise one or more instructions in various memory and storage devices in the computer system 700 that, when read and executed by one or more processors, cause the computer system 700 to perform operations to execute the processes and features described herein. The processes and features described herein may be implemented in software, firmware, hardware (e.g., an application specific integrated circuit), or any combination thereof.

In one implementation, the processes and features described herein are implemented as a series of executable modules run by the computer system 700, individually or collectively in a distributed computing environment. The foregoing modules may be realized by hardware, executable modules stored on a computer-readable medium (or machine-readable medium), or a combination of both. For example, the modules may comprise a plurality or series of instructions to be executed by a processor in a hardware system, such as the processor 702. Initially, the series of instructions may be stored on a storage device, such as the mass storage 718. However, the series of instructions can be stored on any suitable computer readable storage medium. Furthermore, the series of instructions need not be stored locally, and could be received from a remote storage device, such as a server on a network, via the network interface 716. The instructions are copied from the storage device, such as the mass storage 718, into the system memory 714 and then accessed and executed by the processor 702. In various implementations, a module or modules can be executed by a processor or multiple processors in one or multiple locations, such as multiple servers in a parallel processing environment.

Examples of computer-readable media include, but are not limited to, recordable type media such as volatile and non-volatile memory devices; solid state memories; floppy and other removable disks; hard disk drives; magnetic media; optical disks (e.g., Compact Disk Read-Only Memory (CD ROMS), Digital Versatile Disks (DVDs)); other similar non-transitory (or transitory), tangible (or non-tangible) storage medium; or any type of medium suitable for storing, encoding, or carrying a series of instructions for execution by the computer system 700 to perform any one or more of the processes and features described herein.

For purposes of explanation, numerous specific details are set forth in order to provide a thorough understanding of the description. It will be apparent, however, to one skilled in the art that embodiments of the disclosure can be practiced without these specific details. In some instances, modules, structures, processes, features, and devices are shown in block diagram form in order to avoid obscuring the description. In other instances, functional block diagrams and flow diagrams are shown to represent data and logic flows. The components of block diagrams and flow diagrams (e.g., modules, blocks, structures, devices, features, etc.) may be variously combined, separated, removed, reordered, and replaced in a manner other than as expressly described and depicted herein.

Reference in this specification to "one embodiment", "an embodiment", "other embodiments", "one series of embodiments", "some embodiments", "various embodiments", or the like means that a particular feature, design, structure, or characteristic described in connection with the embodiment is included in at least one embodiment of the disclosure. The appearances of, for example, the phrase "in one embodiment" or "in an embodiment" in various places in the specification are not necessarily all referring to the same embodiment, nor are separate or alternative embodiments mutually exclusive of other embodiments. Moreover, whether or not there is express reference to an "embodiment" or the like, various features are described, which may be variously combined and included in some embodiments, but also variously omitted in other embodiments. Similarly, various features are described that may be preferences or requirements for some embodiments, but not other embodiments.

The language used herein has been principally selected for readability and instructional purposes, and it may not have been selected to delineate or circumscribe the inventive subject matter. It is therefore intended that the scope of the invention be limited not by this detailed description, but rather by any claims that issue on an application based hereon. Accordingly, the disclosure of the embodiments of the invention is intended to be illustrative, but not limiting, of the scope of the invention, which is set forth in the following claims.

What is claimed is:

1. A computer-implemented method comprising:
    training, by a computing system, a machine learning model to predict an age division for a person based on one or more features to train the machine learning model including a feature that is a percentage of connections of the person having a same age as the person;
    applying, by the computing system, the machine learning model to predict an age division for a user;
    determining, by the computing system, an age bracket within the age division including a largest number of connections of the user; and
    assigning, by the computing system, the determined age bracket to the user.

2. The computer-implemented method of claim 1, wherein the determining an age bracket within the age division including a largest number of connections of the user is in response to the age division not including a stated age of the user.

3. The computer-implemented method of claim 2, further comprising:
    in response to the age division including the stated age of the user, determining an age bracket within the age division including the stated age.

4. The computer-implemented method of claim 1, further comprising:
    generating a score relating to a preliminary determination of the age division for the user based on the machine learning model.

5. The computer-implemented method of claim 4, further comprising:
    evaluating the score with a threshold associated with a region associated with the user; and
    determining the user to be within the age division if the score satisfies the threshold.

6. The computer-implemented method of claim 5, wherein the threshold relates to a selected accuracy in determination of an age division for a user associated with the region.

7. The computer-implemented method of claim 1, wherein the training the machine learning model is further based on training data including profile information of persons of a social networking system and labels indicating age divisions for the persons, wherein the profile information of the persons includes profile information of persons in different regions.

8. The computer-implemented method of claim 1, wherein an age of the person is a stated age.

9. The computer-implemented method of claim 1, wherein the age division and a second age division are based on a dividing age and each of the age division and the second age division include a plurality of age brackets.

10. The computer-implemented method of claim 1, further comprising:
    comparing engagement by users in a plurality of age brackets across a plurality of products.

11. A computing system comprising:
    at least one processor; and a memory storing instructions that, when executed by the at least one processor, cause the computing system to perform:
training a machine learning model to predict an age division for a person based on one or more features to train the machine learning model including a feature that is a percentage of connections of the person having a same age as the person;
applying the machine learning model to predict an age division for a user;
determining an age bracket within the age division including a largest number of connections of the user; and
assigning the determined age bracket for the user.

12. The system of claim 11, further comprising:
generating a score relating to a preliminary determination of the age division for the user based on the machine learning model.

13. The system of claim 12, further comprising:
evaluating the score with a threshold associated with a region associated with the user; and
determining the user to be within the age division if the score satisfies the threshold.

14. The system of claim 13, wherein the threshold relates to a selected accuracy in determination of an age division for a user associated with the region.

15. The system of claim 11,
wherein the training the machine learning model is further based on training data including profile information of persons of a social networking system and labels indicating age divisions for the persons, wherein the profile information of the persons includes profile information of persons in different regions.

16. A non-transitory computer-readable storage medium including instructions that, when executed by at least one processor of a computing system, cause the computing system to perform a method comprising:
training a machine learning model to predict an age division for a person based on one or more features to train the machine learning model including a feature that is a percentage of connections of the person having a same age as the person;
applying the machine learning model to predict an age division for a user;
determining an age bracket within the age division including a largest number of connections of the user; and
assigning the determined age bracket for the user.

17. The non-transitory computer-readable storage medium of claim 16, further comprising:
generating a score relating to a preliminary determination of the age division for the user based on the machine learning model.

18. The non-transitory computer-readable storage medium of claim 17, further comprising:
evaluating the score with a threshold associated with a region associated with the user; and
determining the user to be within the age division if the score satisfies the threshold.

19. The non-transitory computer-readable storage medium of claim 18, wherein the threshold relates to a selected accuracy in determination of an age division for a user associated with the region.

20. The non-transitory computer-readable storage medium of claim 16,
wherein the training the machine learning model based on training data including profile information of persons of a social networking system and labels indicating age divisions for the persons, wherein the profile information of the persons includes profile information of persons in different regions.

* * * * *